United States Patent [19]

Minoura et al.

[11] 4,318,582

[45] Mar. 9, 1982

[54] TWO-DIMENSIONAL SCANNING APPARATUS

[75] Inventors: Kazuo Minoura, Yokohama; Takehiko Kiyohara, Zama; Haruo Uchiyama, Kawasaki, all of Japan

[73] Assignee: Canon Kabushiki Kaisha, Tokyo, Japan

[21] Appl. No.: 109,274

[22] Filed: Jan. 3, 1980

[30] Foreign Application Priority Data

Jan. 17, 1979 [JP] Japan .................................. 54-3035

[51] Int. Cl.³ ........................................... G02B 27/17
[52] U.S. Cl. ..................................... 350/6.6; 350/6.8; 350/6.91; 358/208
[58] Field of Search .................. 350/6.5, 6.91, 6.6, 350/6.7, 6.8, 6.9; 358/199, 295, 206, 207, 208

[56] References Cited

U.S. PATENT DOCUMENTS

| 4,050,780 | 9/1977 | Wei et al. ........................... 350/6.91 |
| 4,133,005 | 1/1979 | Golay et al. ........................ 358/199 |
| 4,180,307 | 12/1979 | Tateoka et al. ..................... 350/6.5 |

Primary Examiner—John K. Corbin
Assistant Examiner—Rebecca D. Gass
Attorney, Agent, or Firm—Fitzpatrick, Cella, Harper & Scinto

[57] ABSTRACT

A two-dimensional scanning apparatus is disclosed which includes first deflector for deflecting a collimated beam, second deflector for deflecting the incident beam in the direction orthogonal to the direction of deflection by the first deflector, a scanning lens disposed between the first and second deflector, a surface to be scanned on which an image of the scanning beam is formed through the second deflector and a device for moving the scanned surface in the direction orthogonal to the surface in synchronism with the rotational motion of the second deflector so as to obtain a two-dimensional, distortionless scanning pattern on the scanned surface.

8 Claims, 2 Drawing Figures

FIG. I

TWO-DIMENSIONAL SCANNING APPARATUS

BACKGROUND OF THE INVENTION

1. Field of the Invention

The present invention relates to an apparatus for carrying out writing or reading two-dimensional scanning patterns. More particularly, the present invention is directed to such two-dimensional scanning apparatus which enables the obtaining of a distortionless light beam scan image on a surface of a medium to be scanned.

2. Description of the Prior Art

Two-dimensional scanning apparatus of the type mentioned above is known in the art and widely used in various apparatus such as laser printer apparatus and facsimile image transmission apparatus. In the laser printer apparatus, a laser beam is modulated by image information including figure or character coming from an electronic computer or facsimile image transmitter, the modulated beam is two-dimensionally deflected and high quality hard copies are produced at a high speed employing an electrophotographic method or heat mode recording method. In the latter mentioned facsimile image transmission apparatus, the non-modulated laser beam is two-dimensionally deflected to make the beam incident upon a two-dimensional pattern and the reflected light from the pattern is photo-electrically converted to obtain two-dimensional image information.

With the two-dimensional scanning apparatus according to the prior art, scanning effected on a scanned surface contains some distortion. Therefore, it is required to correct the distorted information. For example, a position detector, a large capacity memory or a correcting operation circuit has been used to electrically correct the distorted information. However, such electrical signal processing means is complicated in structure and generally brings forth various disadvantages.

SUMMARY OF THE INVENTION

Accordingly, it is an object of the invention to provide a two-dimensional scanning apparatus which is able to eliminate such distortion involved in two-dimensional scanning without any need of electrical signal processing means as mentioned above but by means of optical and mechanical means.

It is another object of the invention to provide such two-dimensional scanning apparatus in which the light beam spot for scanning a planar surface is moved at uniform speed in two-dimensional directions, namely, in the primary scanning direction and in the secondary scanning direction.

To attain the above and other objects according to the invention there is provided a two-dimensional scanning apparatus comprising a first deflecting device for the primary scanning, a second deflecting device for deflecting the light beam in a plane orthogonal to the scanning plane of the light beam deflected by the first deflecting device, an image forming optical system disposed between the first and second deflecting devices to focus the scanning beam on a surface to be scanned and mechanical means for moving the scanned surface in the direction orthogonal to the surface in synchronism with the deflecting motion of the second deflecting device so as to keep the focal point of the optical system always on the scanned surface.

In the two-dimensional scanning apparatus according to the invention, the speed of scanning beam running in the primary scanning direction on the scanned surface is kept constant by suitably selecting the imaging characteristics, namely distortion characteristics of the image forming optical system according to the deflection characteristics of the deflecting device for the primary scanning. Furthermore, the speed of the scanning beam moving in the secondary scanning direction is also kept constant by suitably selecting the deflection characteristics of the second deflecting device, that is, the rotational speed of the deflecting reflection surface thereof. For the purpose of this specification, the term "primary scanning" means such scanning which is carried out to produce scanning lines on a surface to be scanned and the term "secondary scanning" means such scanning which is carried out in the direction orthogonal to the scanning line. Therefore, the deflecting device for the primary scanning scans the light beam at a higher speed and performs deflection many times during one scanning on the scanned surface. In contrast, the deflecting device for the secondary scanning performs at most only one deflection during one scanning on the scanned surface.

Other and further objects, features and advantages of the invention will appear more fully from the following description taken in connection with the accompanying drawings.

DESCRIPTION OF THE PREFERRED EMBODIMENTS

Figure 1:
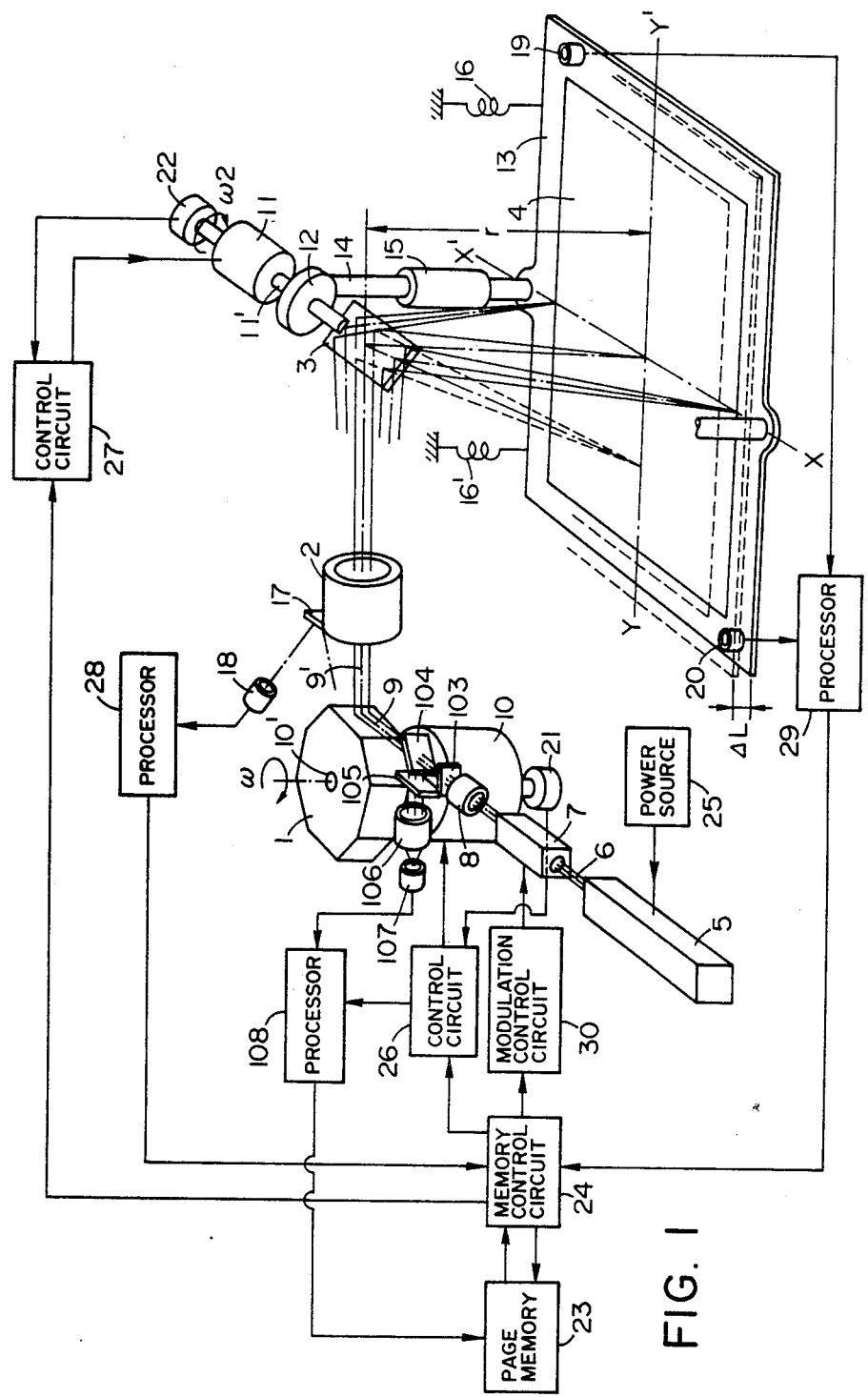
FIG. 1 shows an embodiment of the two-dimensional scanning apparatus according to the present invention.

Referring first to FIG. 1, a first embodiment of the invention is described in detail.

Designated by 1 is a rotary polygon mirror which constitutes the first deflecting means for the primary scanning. 2 is a scanning image forming lens and 3 is a rotary mirror which constitutes the second deflecting means for the secondary scanning. Designated by 4 is a medium to be scanned or a recording medium surface and 5 is a laser oscillator.

A laser beam 6 emitted from the laser ocillator 5 is modulated, if necessary, by a photo modulator 7 and then the diameter of the beam is expanded by a beam expander lens 8 to obtain a collimated beam. The collimated beam is projected on the polygon mirror 1 through a polarizing plate 103 and a half mirror 104. The polygon mirror 1 is mounted on the rotary shaft 10' of a driving motor 10 so that with the rotation of the motor 10 the polygon mirror 1 deflects the incident collimate beam 9 and makes the deflected beam 9' incident upon the scanning lens 2. The lens focuses the deflected beam 9' always on the recording medium surface 4 through the rotary mirror.

The scanning lens 2 is so designed as to have a distortion characteristic corresponding to the rotation characteristic of the first deflecting means, that is, polygon mirror 1. The distortion characteristic of the scanning lens 2 can be represented generally by the following formula (1):

$$y' = F(\omega_1) \tag{1}$$

wherein
- $\omega_1$ is the rotation angle of polygon mirror 1,
- $y'$ is the position of scanning on the scanned surface 4 in the direction of X—X' and
- F is the characteristic function of distortion.

The speed of scanning on the scanned surface can be obtained by differentiating the formula (1) by time t as follows:

$$dy'/dt = (dF/d\omega_1) \cdot (d\omega_1/dt) \tag{2}$$

From the condition that the scanning speed be constant, substituting a constant k for the left term in the above formula (2) gives:

$$dF/d\omega_1 = k/(d\omega_1/dt) \tag{3}$$

By integrating the above formula (3), the distortion characteristic function F is obtained as the following equation (4):

$$F = \int [k/(d\omega_1/dt)'] \cdot d\omega_1 \tag{4}$$

This means that in accordance with the formula (4) the distortion characteristic of the scanning lens can be determined by determining the rotation characteristic $d\omega_1/dt$ of the polygon mirror 1.

In this connection, it is to be noted that the coordinate in the scanned surface has its origin at the center of the surface for the secondary scanning and its X—X' axis in the direction of primary scanning and Y—Y' axis in the direction of secondary scanning.

When there are used a rotary polygon mirror of uniform angular speed as first deflecting means 1 and a lens having a distortion characteristic of $y' = f \cdot \omega_1$ at its focal distance f as the scanning lens 2, the scanning speed in the direction of X—X' on the scanned surface 4 obtained by the first deflecting means 1 is kept constant as given by:

$$dy'/dt = f \cdot (d\omega_1/dt) = f \cdot k_1 = \text{constant} \tag{5}$$

wherein, $k_1$ is constant.

The second deflecting means, that is, the rotary mirror 3 is mounted on the rotation axis 11' of a driving motor 11 so that with the rotation of, the motor, the rotary mirror 3 continuously deflects the beam incident upon the mirror and makes the beam conduct scanning in the direction of Y—Y' on the scanned surface 4.

The second deflecting means 3 is rotated in such manner as to hold the following relation while moving the scanned surface 4 towards the rotary mirror 3 and in parallel with the optical axis by a distance $\Delta L$ as suggested by the broken line in FIG. 1:

$$\omega_2 = \tfrac{1}{2} \sin^{-1}\left(\frac{k_2}{r} \cdot t\right) \tag{6}$$

wherein
- r is a reference distance from the second deflecting means 3 to the scanned surface 4)
- $\omega_2$ is the rotation angle of the second deflecting means 3,
- t is time and $k_2$ is a constant.

More specifically, "reference distance r" is defined as the distance between the deflecting reflection point on the second deflecting means 3 and the scanned surface 4 measured at the time when the beam deflected by the second deflecting means 3 lies on the origin of the coordinate relative to the direction of Y—Y', namely at the time when the scanning beam is scanning on the X—X' axis.

Distance $\Delta L$ changes in synchronism with the rotation characteristic of the second deflecting means 3 in accordance with the following formula:

$$\Delta L = r(1 - \cos 2\omega_2) \tag{7}$$

As will be understood from the foregoing, the scanning beam is focussed always on the scanned surface 4 and the speed of scanning is kept constant so long as the scanned surface 4 is moved in synchronism with the rotation of the second reflecting means 3 in the above described manner.

Since the position Z' scanned by the beam from the second deflecting means 3 in Y—Y' direction on the scanned surface is $$Z' = r \sin 2\omega_2 \tag{8}$$

for the rotation angle $\omega_2$ of the second deflecting means 3, using the formula (6) in the above (8) gives:

$$Z' = k_2 \cdot t \tag{9}$$

which means that the scanning speed is constant.

Referring again to FIG. 1, a rotary cam 12 is fixed to the rotation axis 11' of the driving motor 11. The scanned surface 4 is supported by a supporting plate 13 having, at its one end, a slide shaft 14. The slide shaft 14 is received in a slide bearing 15 and is movable in the direction towards the second deflecting means 3 (direction of the optical axis). Further, springs 16 and 16' are anchored at the one end of supporting plate 13 to keep the free end of the slide shaft 14 in contact with the rotary cam 12 under the force of the springs 16 and 16'. Since the rotary cam 12 is mounted on the rotation axis 11' on which also the second deflecting means, that is, rotary mirror 3 is mounted, a rotation of mirror 3 by $\omega_2$ degrees is transmitted to the scanned surface 4 from the cam 12 through the slide shaft 14. Thus, the scanned surface 4 is shifted by a distance $\Delta L$ according to the above equation (7).

Designated by 17 is a reflecting mirror. Among the deflected means from the first deflecting means, that is, polygon mirror 1 only such beams are directed to and reflected by the reflecting mirror 17 which contain no image information. 18 is a photo sensor element for sensing the deflected beam coming from the reflecting mirror 17 and feeding a light detection signal to a light detection signal processor circuit 28 which in turn generates an information sweep signal at every line scanning and delivers the signal to a memory control circuit 24. Another photo sensing element 19 is provided in the vicinity of the scanned surface 4. The photosensing element 19 receives the deflected beam first scanned by the second deflecting means 3 and issues a modulation start reference signal. 20 is also a photosensing element disposed in the vicinity of the scanned surface 4 to receive the deflected beam last scanned by the second deflecting means 3 and issue a scanning end reference signal.

Provided on the rotation axis 10' of the motor 10 is a rotation position signal generator which may be composed of an encoder of optical type of magnetic induction type or a potentiometer of electric resistance type or capacity type. The signal generator 21 issues a first deflection position signal which is supplied to a control circuit 26 for the first deflection means. The control circuit 26 has a reference clock in itself and compares the first deflection position signal with the reference clock. When any difference is found between the two, the control circuit delivers a correction signal to the driving motor 10 to control the rotation of the motor which is to be always at a constant level of angular velocity.

Similarly, a rotational position signal generator 22 is provided on the rotation axis 11' of the driving motor 11 to control the rotation of the motor 11. The signal generator 22 generates a second deflection position signal which is applied to a control circuit 27 for the second deflecting means. The control circuit 27 makes a comparison between its own reference drive wave form and the second deflection position signal. When there is any difference between the two signals, the control circuit 27 delivers a correction signal to the motor 11 to make it rotate always with constant rotation characteristics.

Designated by 23 is a page memory in which data of image information such as figures and characters (also referred to as pattern inclusively) from an electronic computer or facsimile image transmitter are stored. The above mentioned beam detection signal from the photo sensor 19 is processed in the processor circuit 29 and after a certain delay time an effective scanning start signal is put into a memory control circuit 24 provided for the page memory 23. In synchronism with the effective scanning start signal, the memory control circuit 24 gives the page memory 23 an instruction to sweep the data. The data from the page memory 23 are read out in the memory control circuit 24 sequentially bit by bit for one scanning line using the information sweep signal from the processor circuit 28 as a trigger signal. After reading, the data is applied to a modulation control circuit 30. During the time of scanning in X—X' direction on the scanned surface 4 by scanning beam reflected by every individual reflecting surface of the first deflecting means, an amount of data corresponding to one scanning line are applied to the modulator 7 from the modulation control circuit 30 and a light and dark pattern of one scanning line is given to the laser beam 6.

During the period of one scanning line being scanned by the first deflection means 1, the second deflecting means 3 moves the beam by a suitable number of scanning line intervals. When the two-dimensional scanning on the scanned surface 4 comes near to end, the photo sensor 20 senses the scanning beam and issues an effective scanning end signal. The processor circuit 29 processes the signal and feeds a data sweep mode end signal to the memory control circuit 24. The page memory 23 terminates its data sweep mode in response to the signal. At the same time, the memory control circuit 24 feeds initial position reset signals to the first and second deflecting means control circuits 26 and 27. Thereby, the first and second reflecting means 1 and 3 return back to their initial positions and stop operating. 25 is a power source for driving the laser oscillator 5.

To carry out reading an original document with the apparatus shown in FIG. 1, the original is placed in the position shown for the scanned surface 4 and the apparatus is changed over to the position for document reading mode.

By changing over the mode to document reading mode, the operational mode of the modulator 7 is switched over to constant level operation by the modulation control circuit 30. In this mode, the laser beam 6 emitted from the laser oscillator 5 passes through the modulator 7 without being subjected to modulation and then enters the beam expander lens 8. The beam from the lens 8 is introduced into the polarizer 103 and the polarized beam enters the first deflecting means 1 through the half mirror 104. The first deflecting means directs the beam to the scanning lens 2 and then to the second deflecting means 3 to make the beam two-dimensionally scan the document surface at 4. The reflected light from the document surface runs back along the light path of the above mentioned scanning optical system. The half mirror 104 directs the reflected light to the polarizer plate 105. The direction of polarization by the polarizer plate 105 is shifted by 90° from that of the polarizer plate 103. Therefore, the two beams emerging from the two polarizer plates 103 and 105 are separated from each other so that the light reflected by the document surface and polarized by the polarizer 105 can hold the reflection intensity correctly corresponding to the image information of the document.

The document information containing light coming out from the polarizer 105 is projected on a photo sensor 107 through an imaging lens 106 to generate an image signal. The image signal is applied to an image signal processing circuit 108. The processing circuit processes the signal suitably to encode it in synchronism with the deflecting means control signal coming from the control circuit 26 for the first deflecting means. After encoding, the processing circuit 108 feeds the image signal to the above mentioned page memory 23.

Figure 2:
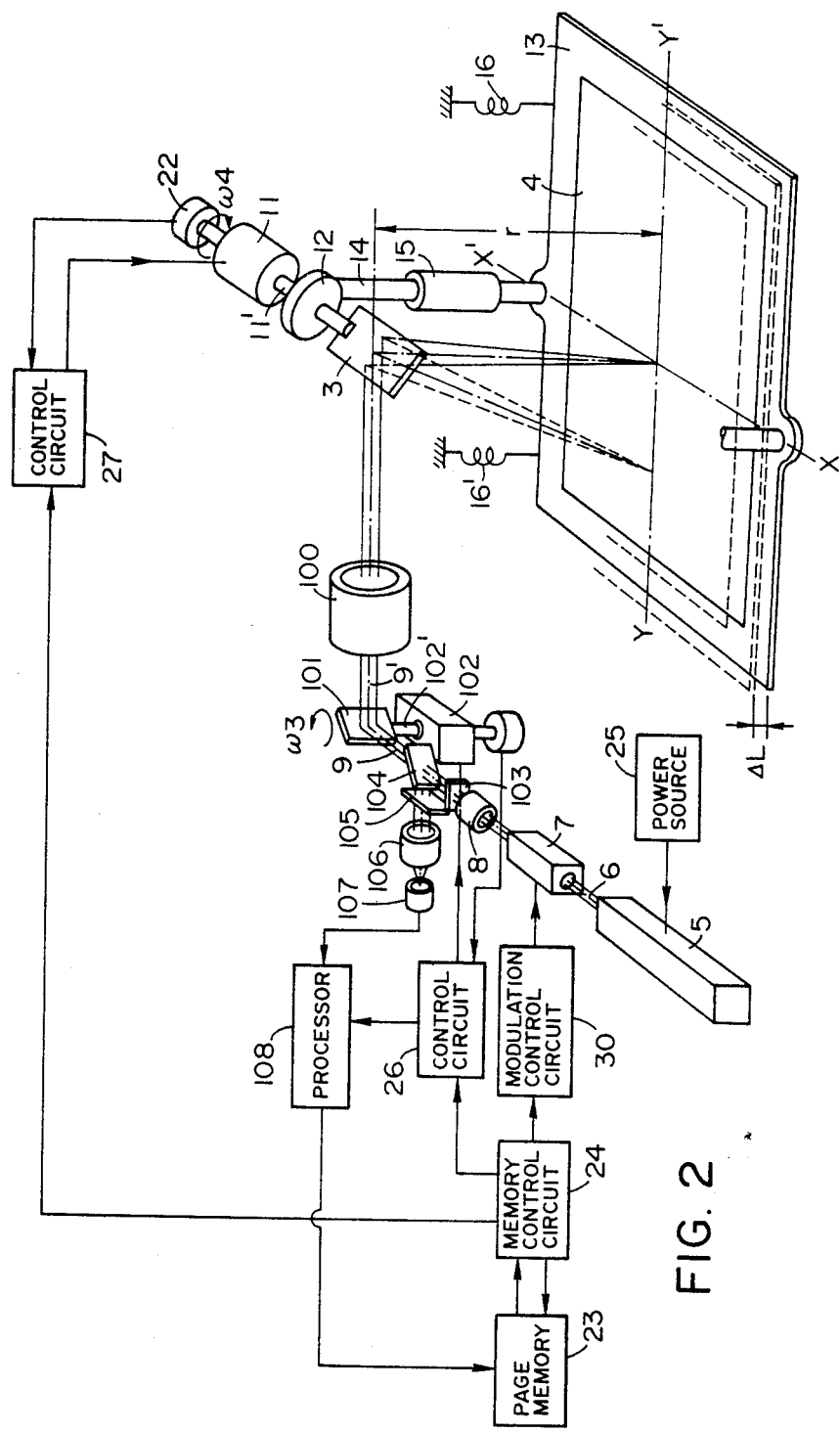
FIG. 2 shows another embodiment thereof.

Another embodiment of the invention is shown in FIG. 2 in which the same parts as those in the above first embodiment are designated by the same reference numerals. As for the same parts no further description will be made hereinafter.

In FIG. 2, the laser beam emitted from the laser oscillator 5 is modulated, if necessary, by the modulator 7 and then expanded in its beam diameter by the beam expander lens 8 while being collimated at the same time. After passing through the lens 8, the beam is incident upon an oscillating mirror 101 through polarizing plate 103 and half mirror 104. The oscillating mirror 101 is fixed to the rotation axis 102' of a reciprocating motor 102. With the reciprocal rotation of the motor 102, the oscillating mirror 101 deflects the incident beam 9. The deflected beam 9' is focused always on the scanned surface 4 through the scanning lens 100.

The scanning lens 100 is so designed as to have a distortion characteristic corresponding to the rotation characterisitc of the first deflecting means, that is, oscillating mirror 101. More particularly, when there is used, as the first deflecting means 101, such mirror which sinusoidally oscillates with an amplitude of $\phi_O$, the scanning lens 100 whose focal length is f, is so designed as to have such distortion characteristic as represented by the following equation:

$$y' = 2\phi_0 f \sin^{-1}(\omega_3/\phi_0) \qquad (10)$$

wherein, y' is the position of the scanning beam on the scanned surface 4 relative to X—X' direction for the rotation angle $\omega_3$ of the first reflecting means.

By satisfying the above condition, the speed of scanning by the first deflecting means 101 in X—X' direction is made constant. Namely, since the rotation angle $\omega_3$ of the first deflecting means 101 is $$\omega_3 = \omega_0 \sin k_3 \cdot t \quad (k_3 = \text{constant}) \quad (11),$$

using this in the above equation (10) gives:

$$y' = 2\phi_0/k_3 \cdot t \quad (12).$$

This means that the scanning speed is constant.

Like the first embodiment, the rotary mirror 3 is fixedly mounted on the rotation axis 11' of the driving motor 11. Therefore, with the rotation of the motor 11 the beam incident upon the rotary mirror 3 effects scanning two-dimensionally in Y—Y' direction on the scanned surface 4.

The second deflecting means 3 is rotated in accordance with the following formula (13) while moving the scanned surface 4 by a distance ΔL towards the second deflecting means:

$$\omega_4 = \tfrac{1}{2} \sin^{-1}\left(\frac{k_2}{r} \cdot t\right) \quad (13)$$

wherein, r is the reference distance between the second deflecting means 3 and the scanned surface 4, $\omega_4$ is the rotation angle of the second deflecting means 3 for time t and $k_2$ is a constant.

The value of ΔL varies depending upon the rotation characteristic of the second deflecting means 3 and is given by:

$$\Delta L = r(1 - \cos 2\omega_4) \quad (14)$$

For the rotation angle $\omega_4$ of the second deflecting means 3, the scanning position Z' of the beam by the second deflecting means 3 in Y—Y' on the scanned surface 4 is given by:

$$Z' = r \sin 2\omega_4 \quad (15).$$

Therefore, using the equation (13) in the above (15) gives:

$$Z' = k \cdot t \quad (16)$$

This means that the speed of scanning is constant.

In a manner similar to that in the first embodiment, the scanned surface 4 is supported on a supporting plate 13 having a slide shaft 14 at its one end. The slide shaft 14 is received in a slide bearing 15 which guides the shaft 14 in the direction towards the second deflecting means 3. Furthermore, springs 16 and 16' are anchored to the one end of the supporting plate 13 so that the free end of the slide shaft is kept in contact with the rotary cam 12 under the action of the springs. Since the rotary cam and the second deflecting means are mounted on the same rotation axis 11', the rotation of the mirror 3 by $\omega_4$ degrees is transmitted to the supporting plate 13 by the cam 12 through the slide shaft 14. Thus, the scanned surface 4 is moved by the distance ΔL towards the mirror 3 according to the above formula (14).

The signal generator 21 mounted on the motor shaft 102' which also has the first deflecting means 101 fixed to the other end generates a first deflection position signal and feeds the signal to the first deflecting means control circuit 26. The control circuit 26 makes a comparison between its own drive wave pulse and the input signal, that is, first deflection position signal to control and determine the deflection frequency and amplitude of the first deflecting means 101. The first deflection position signal can be used also as an information sweep signal for every scanning line as previously described in connection with the first embodiment.

The rotation position signal generator 22 mounted on the motor shaft 11' on which also the rotary mirror 3 is mounted, generates a second deflection position signal and feeds the signal to the second deflecting means control circuit 27. The control circuit 27 compares the signal with its own reference drive wave form and, when there is any difference between the two, it delivers a correction signal to the motor 11 to keep the rotation characteristic of the motor constant. The second deflection position signal issued from the signal generator 22 can be used also as an effective scanning start signal and as an effective scanning end signal as previously mentioned in connection with the first embodiment.

To carry out reading an original document with the apparatus shown in FIG. 2, the document is placed in the position shown for the scanned surface 4 and the apparatus is changed over to the position for document reading mode.

By setting the apparatus to this mode, the operation mode of the modulator 7 is switched over to constant level operation by the modulation control circuit 30. In this mode, the laser beam emitted from the laser oscillator 5 passes through the modulator 7 without being subjected to modulation and then enters the beam expander lens 8. The beam from the lens 8 is polarized by a polarizer 103 and then directed to the first deflecting means 101 after passing through the half mirror 104. The deflected light from the first deflecting means 101 effects scanning the document surface placed at 4 through the scanning lens 100 and the second deflecting means 3. The reflected light from the document surface goes back along the light path of the scanning optical system described above and is directed to a polarizer plate 105 by the half mirror 104. The direction of polarization of the polarizing plate 105 is shifted by 90° from that of the polarizing plate 103. Therefore, the two beams emerging from the two polarizing plates 103 and 105 are separated from each other so that the beam reflected upon the document surface and polarized by the polarizer 105 can hold the reflection intensity correctly corresponding to the image information on the document surface. The beam is focused on a photo sensor 107 through a focusing lens 106 to produce an image signal. This image signal is introduced into the processing circuit 108 in which the image signal is subjected to a suitable encoding processing in synchronism with the deflecting means control signal from the first deflecting means control circuit 26. After encoding, the image signal is fed to the page memory 23.

In this manner, according to the invention, distortion in two-dimensional scanning is optically and mechanically corrected. In the arrangement of the invention, a scanning lens is disposed between the first and second deflecting means and the scanning beam coming out from the scanning lens is made incident upon the second surface through the second deflecting means. At the same time, the scanned surface is moved towards the second deflecting means in connection with the motion of the latter. Thus, distortion is corrected in a simple manner. It becomes no longer necessary to use complicated electric signal processing means.

What we claim is:

1. A two-dimensional scanning apparatus comprising:
   means for supplying a light beam;
   first deflecting means for deflecting said beam and carrying out primary scanning on a surface to be scanned;
   second deflecting means for deflecting the beam in a plane orthogonal to the plane in which the beam is deflected by said first deflecting means and carrying out secondary scanning in the direction orthogonal to the direction of said primary scanning on said scanned surface;
   an image forming optical system disposed between said first and second deflecting means; and
   mechanical means for moving said scanned surface in the direction orthogonal to said surface in synchronism with the deflecting motion of said second deflecting means in such manner that the position of the focal point of said optical system may always lie on said scanned surface.

2. A two-dimensional scanning apparatus according to claim 1, wherein the moving distance of said scanned surface $\Delta L$ and the rotation angle of said second deflecting means $\omega_2$ hold the following relation:

$$\Delta L = r(1 - \cos 2\omega_2)$$

wherein, r is the reference distance from the deflection reflecting surface of said second deflecting means and said scanned surface.

3. A two-dimensional scanning apparatus according to claim 2, wherein the rotation angle $\omega_2$ of said second deflecting means is:

$$\omega_2 = \tfrac{1}{2} \sin^{-1}\left(\frac{k_2}{r} \cdot t\right)$$

wherein, $k_2$ is a constant and t is time.

4. A two-dimensional scanning apparatus according to claim 1, wherein said first deflecting means is a polygon mirror rotating at a uniform angular velocity and said image forming optical system has such imaging characteristic as represented by the following formula:

$$y' = f\omega_1$$

wherein,
   $\omega_1$ is the rotation angle of said polygon mirror,
   f is the focal length of said optical system and
   y' is the position of scanning in the direction of primary scanning on the scanned surface.

5. A two-dimensional scanning apparatus according to claim 1, wherein said first deflecting means is a reflecting mirror which executes a sinusoidal oscillation with an amplitude of $\phi_0$ and which also rotates with a rotation angle of $\omega_3$ for time t as determined by the following equation:

$$\omega_3 = \phi_0 \sin k_3 \cdot t \quad (k_3 \text{ is constant}),$$

and wherein said image forming optical system has such imaging characteristic as represented by the following formula:

$$y' = 2\phi_0 \cdot f \cdot \sin^{-1}(\omega_3/\phi_0)$$

wherein, y' is the position of scanning in the direction of primary scanning on the scanned surface and f is the focal length of said optical system.

6. A two-dimensional scanning apparatus comprising:
   a light source for feeding a collimate light beam;
   a first deflecting device for deflecting said beam in a predetermined direction;
   a second deflecting device for deflecting said beam in a plane perpendicular to the deflection scanning surface of said beam deflected by said first deflecting means;
   a surface to be scanned two-dimensionally by said beam from said second deflecting device;
   an image forming optical system disposed between said first and second deflecting devices for focusing said beam on said scanned surface; and
   mechanical means for moving said scanned surface in the direction orthogonal thereto in synchronism with the deflecting motion of said second deflecting device to keep the focal point of said optical system always on said scanned surface.

7. A two-dimensional scanning apparatus for scanning a surface, comprising:
   a two-dimensional deflecting system including primary deflecting means and secondary deflecting means, said primary deflecting means effecting scanning on said surface in one direction, and said secondary deflecting means effecting scanning on said surface in a direction orthogonal to said one direction;
   means for receiving a light beam from said deflecting system;
   an image forming optical system disposed between said primary deflecting means and said secondary deflecting means; and
   mechanical means for moving said scanned surface in the direction orthogonal thereto in synchronism with the deflecting motion of said secondary deflecting means to keep the focal point of said optical system always on said scanned surface.

8. A two-dimensional scanning apparatus for scanning a surface comprising:
   means for supplying a light beam;
   first deflecting means for deflecting said light beam and effecting primary scanning on a surface to be scanned;
   second deflecting means for deflecting a light beam in a direction orthogonal to the direction of deflection of the light beam by said first deflecting means and effecting secondary scanning on said surface in a direction orthogonal to said primary scanning;
   an image forming optical system disposed between said first deflecting means and said second deflecting means;
   mechanical means for moving said scanned surface in the direction orthogonal thereto in synchronism with the deflecting motion of said second deflecting means to keep the focal point of said optical system always on scanned surface;
   light dividing means disposed between said light supplying means and said first deflecting means; and
   means for receiving the light beam from said surface by way of said second deflecting means, said image forming optical system, first deflecting means and light dividing means, respectively.

* * * * *